United States Patent

Hester, Jr.

[15] 3,676,558
[45] July 11, 1972

[54] ANOREXIGENIC COMPOSITIONS COMPRISING 6-ALKYL-1,2,3,4,5,6-HEXAHYDROAZEPINO 4,5-INDOLES AS ACTIVE INGREDIENT AND PROCESS OF TREATMENT

[72] Inventor: Jackson B. Hester, Jr., Kalamazoo, Mich.

[73] Assignee: The Upjohn Company, Kalamazoo, Mich.

[22] Filed: Aug. 28, 1970

[21] Appl. No.: 68,046

Related U.S. Application Data

[63] Continuation-in-part of Ser. No. 868,927, Oct. 23, 1969, which is a continuation of Ser. No. 548,880, May 10, 1966, abandoned.

[52] U.S. Cl. ...........................................424/274
[51] Int. Cl. ............................................A61k 27/00
[58] Field of Search.................................424/274

[56] References Cited

UNITED STATES PATENTS 3,525,750   8/1970   Renner..............................260/326.5

Primary Examiner—Jerome D. Goldberg
Attorney—John Kekich and John J. Killinger

[57] ABSTRACT

Compositions comprising 6-alkyl-1,2,3,4,5,6-hexahydroazepino[4,5-b]indole of the formula:

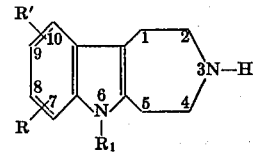

(Formula VI)

wherein R and R' are selected from the group consisting of hydrogen, alkoxy and alkyl containing from one to three carbon atoms, inclusive, and halogen; wherein $R_1$ is alkyl defined as above; including pharmacologically acceptable acid addition salts of those compounds, in combination with conventional pharmaceutical carriers. The compositions are used to suppress hunger in mammals.

8 Claims, No Drawings

ANOREXIGENIC COMPOSITIONS COMPRISING 6-ALKYL-1,2,3,4,5,6-HEXAHYDROAZEPINO 4,5-INDOLES AS ACTIVE INGREDIENT AND PROCESS OF TREATMENT

CROSS-REFERENCES TO RELATED APPLICATIONS

This application is a continuation-in-part of application, Ser. No. 868,927, filed Oct. 23, 1969, which in turn is a continuation-in-part of application, Ser. No. 548,880, filed May 10, 1966, now abandoned.

BRIEF SUMMARY OF THE INVENTION

This invention relates to pharmaceutical compositions prepared in unit dosage form comprising from about 5 to about 500 mg. of a compound of the formula:

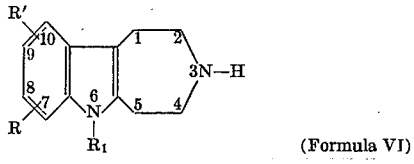

(Formula VI)

wherein R, R' and $R_1$ are as previously defined, including the pharmacologically acceptable acid addition salts thereof in association with a pharmaceutical carrier. Another aspect of the invention is a process for inducing anorexia in obese subjects to produce weight loss.

DETAILED DESCRIPTION

Compounds of the Formula VI and pharmacologically acceptable acid addition salts thereof can be prepared by methods disclosed in French Special Medicinal Pat. No. 1,524,495 filed May 9, 1967 and issued Apr. 1, 1968.

A compound of the Formula VI or pharmacologically acceptable acid addition salts thereof are presented for oral administration in solid and liquid unit dosage forms, such as tablets, coated and uncoated, capsules, powders, granules, syrups, elixirs, and the like, containing suitable quantities of the compound.

Powders are quite simply prepared by comminuting a compound of the Formula VI or pharmacologically acceptable acid addition salts thereof to a suitable fine size and mixing with a similarly comminuted diluent. The diluent can be an edible carbohydrate material such as starch or lactose. Advantageously, a sweetening agent or sugar is present as well as a flavoring. Dry granulations for reconstruction with water are prepared utilizing water-soluble diluents. A powder mixture of finely divided compound of the Formula VI or pharmacologically acceptable acid addition salts thereof and a water-soluble diluent such as sucrose, glucose, and the like, is wetted with a binder such as acacia mucilage or gelatin solution and forced through a screen to form granules which are allowed to dry. Advantageously, a thickening or suspending agent such as methylcellulose is present as well as a wetting agent and flavoring.

Capsules are produced by preparing a powder mixture as hereinbefore described and filling into formed gelatin sheaths. Advantageously, as an adjuvant to the filling operation, a lubricant such as talc, magnesium stearate and calcium stearate is added to the powder mixture before the filling operation.

Tablets are made by preparing a powder mixture, wet granulating or dry granulating by slugging, adding a lubricant and pressing into tablets. The powder mixture is prepared by mixing a compound of the Formula VI and pharmacologically acceptable acid addition salts thereof suitably comminuted, with a diluent or base such as starch, lactose, kaolin, dicalcium phosphate and the like. The powder mixture can be granulated by wetting with a binder such as corn syrup, gelatin solution, methylcellulose solution or acacia mucilage and forcing through a screen. An alternative granulating procedure is by slugging the powder mixture, i.e., run the powder mixture through a tablet machine and the resulting large tablets broken into pieces (slugs). The slugs can be lubricated to prevent sticking to the tablet-forming dies by means of the addition of stearic acid, a stearate salt, talc, or mineral oil. The lubricated mixture is then compressed into tablets of the required weight.

Advantageously, the tablet can be provided with a protective coating consisting of a sealing coat of shellac, a coating of sugar and methylcellulose and a polish coating of carnauba wax.

Oral fluids are prepared in unit dosage forms such as syrups and elixirs wherein each teaspoonful of composition contains a predetermined amount of a compound of the Formula VI and pharmacologically acceptable acid addition salts thereof for administration.

A syrup is prepared using a water soluble salt of a compound of the Formula VI in a suitable flavored aqueous sucrose solution. Similarly an elixir is prepared utilizing a hydroalcoholic vehicle. Elixirs are advantageous vehicles for use when another therapeutic agent which is not sufficiently water soluble is to be included in the composition.

For parenteral administration aqueous fluid unit dosage forms can be prepared. In preparing the parenteral form, a measured amount of a water soluble salt of a compound of the Formula VI and a pharmacologically acceptable acid is placed in a vial, the vial and its contents sterilized and sealed. An accompanying vial of sterile water is provided as a vehicle to form a solution prior to administration. Advantageously, the sterile water can have dissolved therein a local anesthetic and buffering agents.

Alternatively, a parenteral suspension can be prepared by suspending an insoluble form of a compound of the Formula VI in a sterile aqueous vehicle or in a parenterally acceptable vegetable oil with or without additional adjuvants.

In addition to oral and parenteral administration, the rectal route can be utilized. A compound of the Formula VI and pharmacologically acceptable acid addition salts thereof can be administered by means of a suppository. A vehicle which has a melting point at about body temperature or one that is readily soluble can be utilized. For example, cocoa butter and various solid polyethylene glycols can serve as the vehicle.

For the treatment of domestic birds and animals by oral administration, a compound of the Formula VI and pharmacologically acceptable acid addition salts thereof is conveniently prepared in the form of a food premix. The food premix can comprise the active material in admixture with an edible diluent such as starch, oatmeal, flour, calcium carbonate, talc, dried fish meal and the like non-toxic, orally acceptable edible diluents. The prepared premix is then conveniently added to the regular feed, thereby providing medication to the animal or bird in the course of feeding.

The compositions of the present invention have anorexigenic activity. The compositions are useful in the treatment of obesity.

The amount of a compound of the Formula VI and pharmacologically acceptable acid addition salts thereof to be administered varies with the weight, age, condition, route of administration and species of animal. In general a dose of from about 0.3 to about 250 mg./kg./day and preferably from about 1 to about 75 mg./kg./day is administered. The human daily dose can be from about 5 to about 1000 mg. in single or divided doses and preferably divided doses of 10 to 250 mg. before meals.

Conveniently the compositions are prepared in dosage unit form of from about 10 to about 250 mg. per dosage unit.

In addition to the administration of a compound of the Formula VI and pharmacologically acceptable acid addition salts thereof as the principal active ingredient of compositions described herein, the said compound can be included with other types of active anorexigenic compounds, sedatives and tranquilizers to obtain advantageous combinations of properties with the following ingredients in approximately the indicated amounts: d-amphetamine sulfate (2–10 mg.); methamphetamine (2–10 mg.); benzphetamine (10–50 mg.);

phenmetrazine (5–25 mg.); fenfluramine (5–50 mg.); diethylpropion hydrochloride (2–25 mg.); chlorophentermine hydrochloride (10–100 mg.); phenobarbital (5–50 mg.); amobarbital (5–60 mg.); aprobarbital (10–40 mg.); butabarbital (8–60 mg.); pentobarbital (15–40 mg.); chlorpromazine (10–50 mg.); fluphenazine (2–10 mg.); meprobamate (100–400 mg.); and phenaglycodol (100–600 mg.).

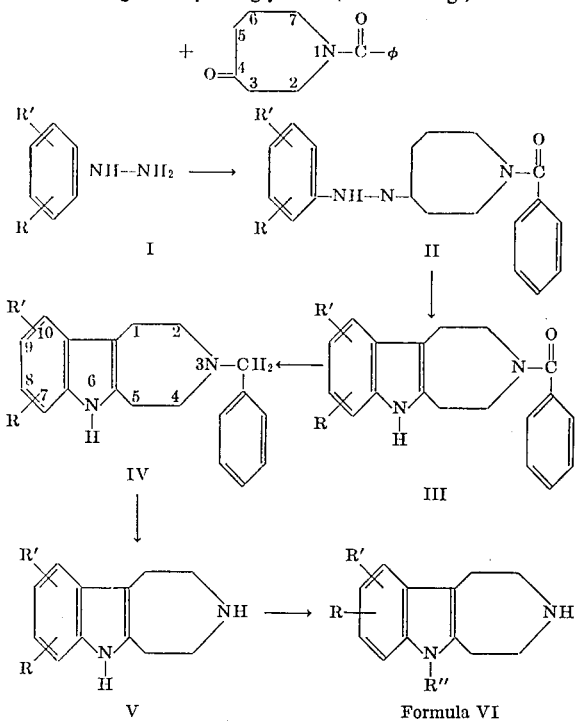

wherein R and R' are selected from the group consisting of hydrogen, alkoxy and alkyl containing from one to three carbon atoms, inclusive, and halogen, with the proviso that at least one of the two other positions (to the hydrazino group) in compound I is hydrogen; wherein R'' is selected from the group consisting of alkyl containing from 1 to 3 carbon atoms, inclusive.

The preparation of the active compounds consists of: heating a phenylhydrazine of Formula I with 1-benzoylhexahydro-4H-azepin-4-one to obtain the corresponding phenylhydrazone of 1-benzoylhexahydro-4H-azepin-4-one (II); heat-II with formic acid to obtain the corresponding 3-benzoyl-1,2,3,4,5,6-hexahydroazepino[4,5-b]indole (III); reducing III with a metal hydride, e.g., lithium aluminum hydride, to obtain the corresponding 3-benzyl-1,2,3,4,5,6-hexahydroazepino[4,5-b]indole (IV); hydrogenolyzing IV in the presence of a palladium catalyst to give the corresponding 1,2,3,4,5,6-hexahydroazepino[4,5-b]indole (V); alkylating compound V with an alkyl halide in which the alkyl is methyl, ethyl, propyl or isopropyl and the halogen is bromine or iodine in the presence of sodium hydride to give the corresponding 6-alkyl 1,2,3,4,5,6-hexahydroazepino[4,5-b]indole (VI) often isolated as the hydrochloride, hydrobromide or hydroiodide.

In carrying out the process, the selected phenylhydrazine of Formula I is refluxed with 1-benzoyl-hexahydro-4H-azepin-4-one in a solvent such as ethanol, benzene, toluene or the like. In the preferred method, an acid catalyst such as acetic acid in a quantity of about 0.25 to 1.5 percent, calculated on the amount of solvent, is added to obtain higher yields. The total time of the reaction may vary between half an hour and 4 hours at the reflux temperature of the solvent. At the termination of the reaction, the product is isolated by conventional means such as by crystallization, filtration, extraction and the like.

The thus-obtained 1-benzoylhexahydro-4H-azepin-4-one phenylhydrazone (II) is thereupon heated with formic acid of a concentration of 88 to 99 percent for a period usually between 10 minutes and 2 hours in order to provide crude 3-benzoyl-1,2,3,4,5,6-hexahydroazepino[4,5-b]indole (III) which is isolated and purified by conventional procedures, such as pouring the reaction mixture into ice water, collecting the resulting product by filtration and recrystallizing, chromatographing, or extracting the product to obtain the pure 3-benzoyl-1,2,3,4,5,6-hexahydroazepino-[4,5-b]indole (III).

The thus-obtained 3-benzoyl-1,2,3,4,5,6-hexahydroazepino[4,5-b]indole is reduced with a metal hydride, preferably lithium aluminum hydride, in tetrahydrofuran solution. The reaction is, at first, generally carried out under nitrogen during a period of about one-half hour to 8 hours at about room temperature, that is, between 20°–30° C. Higher or lower temperatures in the initial phase can be used. Thereafter, the temperature is increased to the reflux temperature of the mixture, and the mixture is heated for a period between 6 to 24 hours. The products are obtained by decomposing the reaction mixture, after cooling, with water and a base such as sodium hydroxide or potassium hydroxide and filtering the solution. Concentration of the filtrate gives the desired 3-benzyl-1,2,3,4,5,6-hexahydroazepino[4,5-b]indole (IV).

Removal of the benzyl group of the 3-benzyl-1,2,3,4,5,6-hexahydroazepino[4,5-b]indole is achieved by hydrogenolysis in the presence of a Nobel metal catalyst, e.g., a palladium or platinum catalyst (5 to 10 percent platinum or palladium on a carbon carrier). The hydrogenolysis may be carried out at a pressure between 10 to 75 pounds of hydrogen and is generally completed within between 1 to 8 hours at room temperature. At the termination of the reaction, the catalyst is removed by filtration, the filtrate is concentrated and the crude product purified in conventional manner, such as by recrystallization, formation of a salt and treating the salt with a base, or the like.

The thus-obtained 1,2,3,4,5,6-hexahydroazepino[4,5-b]-indole (V) is alkylated in the 6-position, in conventional manner, with an alkyl bromide or alkyl iodide such as methyl, ethyl, propyl, isopropyl bromide or iodide.

Preparation 1 1-Benzoylhexahydro-4H-azepin-4-one

A. 1-benzoylhexamethyleneimine [1-benzoylhexahydro-4 H-azepine]

Benzoyl chloride (60 ml.) in 200 ml. of Skellysolve B hexanes was added to a stirred, cooled (ice-bath) solution of 200 ml. of hexamethyleneimine in 800 ml. of Skellysolve B hexanes. The mixture was then washed several times with 1N hydrochloric acid and with water, and filtered through anhydrous sodium sulfate. Evaporation of the Skellysolve B hexanes and distillation of the oily residue gave 40.5 g. of 1-benzoylhexamethyleneimine, b.p. 150°–160° C./1 torr.

Analysis:

Calcd. for $C_{13}H_{17}NO$:

N, 6.89.

Found:

N, 6.54.

B. Fermentation of 1-benzoylhexamethyleneimine

A medium was prepared of 200 g. of cornsteep liquor (60 percent solids), 100 g. of commercial dextrose, and 10 l. of tap water. The pH was adjusted to between 4.8 and 5 and 10 ml. of lard oil was added as a foam preventive. This medium was sterilized and inoculated with a 72-hour vegetative growth of *Sporotrichum sulfurescens*, ATCC 7159, and after incubation for 24 hours at a temperature of about 28° C. using a rate of aeration of 0.5 l. per minute and agitation of 300 r.p.m., the substrate, 2 g. of acetone (about 20 ml.) was then added to the fermentation. After an additional 72-hour period of incubation at the same temperature and aeration, the beer and mycelium were separated by filtration. The mycelium was washed with water and the wash water was added to the beer filtrate. The thus-obtained beer filtrate was extracted four times with a volume of methylene chloride equal to one-fourth the volume of the filtrate. The combined extracts were washed with one-fourth volume of distilled water and the solvent was removed by distillation to give a residue.

The residue thus obtained was chromatographed on Florisil and eluted with Skellysolve B hexanes containing increasing portions of acetone. The 25 percent acetone-75 percent Skellysolve B hexanes eluate gave about 250 mg. of 1-benzoylhexahydro-4H-azepin-4-one and the acetone eluate gave 1-benzoyl-4-hydroxyhexahydro-4H-azepine determined by thin layer chromatography.

C. Oxidation of 1-benzoyl-4-hydroxyhexahydro-4H-azepine

The 1-benzoyl-4-hydroxyhexahydro-4H-azepine thus obtained was dissolved in acetone and oxidized at room temperature by the addition of a visible excess of Jones' reagent (2.67M chromic acid reagent prepared from 26.7 g. of chromium trioxide and 23 ml. of sulfuric acid, diluted to 100 ml. with water). The excess oxidant was destroyed by the addition of isopropyl alcohol and the mixture was evaporated to dryness. Water (20 ml.) was added, and the product was extracted with 20 ml. of methylene chloride. The extract was evaporated to dryness and the residual 1-benzoylhexahydro-4H-azepin-4-one thus obtained was combined with the same product obtained directly from the bioconversion. The combined product was chromatographed on a column of Florisil (anhydrous magnesium silicate). The column was eluted with Skellysolve B hexanes containing increasing proportions of acetone and those fractions containing the desired product, as determined by thin layer chromatography, were combined and evaporated to give about 770 mg. of 1-benzoylhexahydro-4H-azepin-4-one as an oil, b.p. 170°–174° C./0.3 torr., that crystallized slowly.

Analysis:
Calcd. for $C_{13}H_{15}NO_2$:
C, 71.86; H, 6.96; N, 6.45.
Found:
C, 71.51; H, 7.25; N, 6.46.

Preparation 2 Phenylhydrazone of 1-benzoylhexahydro-4H-azepin-4-one

A mixture of 20 g. (0.092 mole) of 1-benzoylhexahydro-4H-azepin-4-one, 10.5 g. of phenylhydrazine (0.097 mole), 200 ml. of absolute ethanol and 1.5 ml. of acetic acid was refluxed for a period of 1 hour and then cooled in an ice bath. Crystals formed which were collected by filtration, washed with ethanol and dried to yield 20.8 g. (74 percent) of the phenylhydrazone of 1-benzoylhexahydro-4H-azepin-4-one of melting point 185°–190° C.

Preparation 3 p-Methoxyphenylhydrazone of 1-benzoylhexahydro-4H-azepin-4-one

A solution of 120.1 g. (0.869 mole) of p-methoxyphenylhydrazine, 172.0 g. (0.792 mole) of 1-benzoylhexahydro-4H-azepin-4-one and 12.9 ml. of glacial acetic acid in 1,725 ml. of absolute ethanol was refluxed in a nitrogen atmosphere for a period of 1 hour. The reaction mixture was then cooled and concentrated under reduced pressure. The product which had crystallized from the solution was collected by filtration, washed with ethanol and dried to give 108.9 g. of 1-benzoyl-hexahydro-4H-azepin-4-one p-methoxyphenylhydrazone of melting point 155.5°–166.5° C. A second crop was obtained by concentrating the mother liquors, providing an additional amount of 32.9 g. so that the total yield was 53 percent.

Preparation 4 m-Methoxyphenylhydrazone of 1-benzoylhexahydro-4H-azepin-4-one

To a 3N aqueous sodium hydroxide solution (300 ml.) and ether (300 ml.) was added 62.7 g. (0.360 mole) of m-methoxyphenylhydrazine hydrochloride. This mixture was stirred until the material went into solution, the ether layer was separated and the aqueous layer extracted with additional ether. The ether layer and extracts were washed with brine, dried over anhydrous potassium carbonate and concentrated under reduced pressure at about 25° C. to give a residue. To a solution of the residue in 500 ml. of ethanol was added a solution of 1-benzoylhexahydro-4H-azepin-4-one (65 g.; 0.3 mole) in 300 ml. of ethanol and 5 ml. of acetic acid. The resulting solution was refluxed under nitrogen for 1 hour and then concentrated under reduced pressure. The product which crystallized from the partially concentrated reaction mixture was collected by filtration, washed with ethanol and dried to give 45.2 g. (44.7 percent) of m-methoxyphenylhydrazone of 1-benzoylhexahydro-4H-azepin-4-one of melting point 153°–159° C.

Preparation 5 o-Methoxyphenylhydrazone of 1-benzoylhexahydro-4H-azepin-4-one

To a stirred mixture of 3N aqueous sodium hydroxide (300 ml.) and 300 ml. of ether was added 62.7 g. (0.360 mole) of o-methoxyphenylhydrazine hydrochloride. After solution was achieved, the aqueous layer was saturated with sodium chloride, separated from the ether layer and and extracted with ether. The combined ether layer and extracts were washed with brine, dried over potassium carbonate and concentrated under reduced pressure at 25° C. to give a residue. The residue was dissolved in 500 ml. of ethanol and was thus added to a solution of 65 g. (0.300 mole) of 1-benzoylhexahydro-4H-azepin-4-one in 300 ml. of ethanol and 5 ml. of acetic acid. The mixture was refluxed for 1 hour and concentrated under reduced pressure. The resulting residue was crystallized from ethanol to give a total of 34.3 g. of o-methoxyphenylhydrazone of 1-benzoylhexahydro-4H-azepin-4-one of melting point 145°–154° C.

Preparation 6 3-Benzoyl-1,2,3,4,5,6-hexahydroazepino[4,5-b]indole

A mixture of 5 g. (16.3 moles) of the phenylhydrazone of 1-benzoylhexahydro-4H-azepin-4-one and 35 ml. of 97 percent formic acid was heated on the steam bath in a nitrogen atmosphere for 20 minutes. It was then poured into ice water giving a dark brown solid which was collected by filtration, washed with water and dried in vacuo to yield 4.5 g. of a crude product. This material was chromatographed over 300 g. of silica gel with mixtures of 15–30 percent acetone, balance cyclohexane. The product thus obtained was evaporated and crystallized from methanol-water to give 1.9 g. (40 percent) of 3-benzoyl-1,2,3,4,5,6-hexahydroazepino[4,5-b]indole of melting point 169°–170° C.

Analysis:
Calcd. for $C_{19}H_{18}N_2O$:
C, 78.59; H, 6.25; N, 9.65.
Found:
C, 78,26; H, 6.22; N, 9.43.

Preparation 7 3-Benzoyl-9-methoxy-1,2,3,4,5,6-hexahydroazepino[4,5-b]indole

To 100 ml. of about 3N hydrogen chloride solution in absolute ethanol was added 3.37 g. (0.010 mole) of p-methoxyphenylhydrazone of 1-benzoylhexahydro-4H-azepin-4-one. This mixture was heated on the steam bath for a period of 7 minutes, then poured into ice water. The solid was collected by filtration, washed with water and dissolved in methylene chloride. The methylene chloride solution was dried over anhydrous magnesium sulfate, concentrated to about 10 ml. and poured over a column containing 250 g. of neutral alumina. The column was eluted with 80 percent ethyl acetate-20 percent Skellysolve B hexanes and the resulting product crystallized from ethyl acetate to yield 0.3 g. (9.37 percent) of 3-benzoyl-9-methoxy-1,2,3,4,5,6-hexahydroazepino[4,5-b]indole of melting point 129.5°–133° C. (dec.).

Preparation 8 3-Benzoyl-8-methoxy-1,2,3,4,5,6-hexahydroazepino[4,5-b]indole and 3-benzoyl-10-methoxy-1,2,3,4,5,6-hexahydroazepino-[4,5-b]indole A mixture of 43.9 g. (0.130 mole) of the m-methoxyphenylhydrazone of 1-benzoylhexahydro-4H-azepin-4-one and 195 ml. of 88 percent formic acid was heated on the steam bath in a nitrogen atmosphere for a period of 30 minutes. It was then cooled and poured into ice water. The resulting mixture was extracted with chloroform, the chloroform extracts were washed with water, dried over anhydrous magnesium sulfate and concentrated in vacuo. The resulting residue was chromotographed over 2.2 kg. of silica gel with a mixture of 60 percent ethyl acetate-40 percent cyclohexane. Twenty-five 1.5 l. fractions were collected. The first band, obtained from fractions 8–11, was crystallized from methylene chloride-ethyl acetate to yield 2.66 g. of 3-benzoyl-10-methoxy-1,2,3,4,5,6- hexahydroazepino[4,5]-indole of melting point 263.5°–267° C. A second crop of this material was obtained weighing 0.185 g. (total yield 6.82 percent). The product when recrystallized from methylene chloride-methanol gave pure 3-benzoyl-10-methoxy-1,2,3,4,5,6-hexahydroazepino[4,5-b]indole of melting point 264.5°–266.5° C.
Analysis:
Calcd. for $C_{20}H_{20}N_2O_2$:
C, 74.97; H, 6.29; N, 8.74.
Found:
C, 74.49; H, 6.63; N, 9.01.

The second isomer, obtained from fractions 14–17 was crystallized from methylene chloride-ethyl acetate to give 5.86 g. of 3-benzoyl-8-methoxy-1,2,3,4,5,6-hexahydroazepino[4,5-b]indole of melting point 201.5°–203° C. A second fraction of 3.98 g. of the same material was also obtained. Recrystallization of the product from methylene chloride-methanol gave pure 3-benzoyl-8-methoxy-1,2,3,4,5,6-hexahydroazepino[4,5,-b]indole of melting point 202°–203.5° C.
Analysis:
Calcd. for $C_{20}H_{20}N_2O_2$:
C, 74.97; H, 6.29; N, 8.74.
Found:
C, 74.77; H, 6.50; N, 8.62.

Preparation 9 3-Benzoyl-7-methoxy-1,2,3,4,5,6-hexahydroazepino[4,5-b]indole

A mixture of 29.9 g. (0.0888 mole) of the o-methoxyphenylhydrazone of 1-benzoylhexahydro-4H-azepin-4-one and 88 percent formic acid (120 ml.) was heated on the steam bath in a nitrogen atmosphere for a period of 30 minutes and poured thereupon into 2.5 l. of ice water. This mixture was extracted with chloroform, the chloroform extracts were washed with water, dried over anhydrous potassium carbonate and concentrated under reduced pressure to give a residue. This residue was chromatographed over silica gel (1.5kg.) and eluted with 60 percent ethyl acetate-40 percent cyclohexane. The product thus obtained was crystallized from methylene chloride-ethyl acetate to give 1.15 g. of 3-benzoyl-7-methoxy-1,2,3,4,5,6-hexahydroazepino[4,5]indole of melting point 203°–204.5° C. A second crop of 0.754 g. was obtained of the same material providing a total yield of 6.69 percent.
Analysis: -hexahydroazepino-[
Calcd. for $C_{20}H_{20}N_2O_2$:
C, 74.97; H, 6.29; N, 8.74.
Found:
C, 75.00; H, 6.45; N, 8.92.

Preparation 10 3-Benzyl-1,2,3,4,5,6-hexahydroazepino-]4,5-b]indole -hexahydroazepino-[

To a stirred mixture of 6 g. of lithium aluminum hydride in 400 ml. of dry tetrahydrofuran was added a solution of 6 g. (20.6 mmoles) of 3-benzoyl-1,2,3,4,5,6-hexhydroazepino[4,5-b]indole in 150 ml. of tetrahydrofuran. The addition was carried out in a nitrogen atmosphere during 1 hour. The resulting mixture was stirred at room temperature (about 25° C.) for about 4 hours and then refluxed for 18 hours. The mixture was then cooled in an ice bath and treated first with 6 ml. of water, then with 6 ml. of 15 percent sodium hydroxide solution and then with 18 ml. of water. This mixture was stirred for 2 hours and then filtered. The filtrate was concentrated under reduced pressure to give a residue and the residue was crystallized from ethyl acetate-Skellysolve B hexanes to give 3.37 g. (59 percent) of 3-benzyl-1,2,3,4,5,6-hexahydroazepine[4,5-b]indole of melting point 116°–117° C.
Analysis:
Calcd. for $C_{19}H_{20}N_2$:
C, 82.57; H, 7.30; N, 10.14.
Found:
C, 82.34; H, 7.52; N, 10.04.

Preparation 11 3-Benzyl-9-methoxy-1,2,3,4,5,6-hexahydroazepino[4,5-b]indole

To an ice-cold suspension of 1 g. of lithium aluminum hydride in 100 ml. of tetrahydrofuran was added 1 g. (0.00312 mole) of 3-benzyol-9-methoxy-1,2,3,4,5,6-hexahydroazepino[4,5-b]indole and the mixture was refluxed in a nitrogen atmosphere for a period of 18 hours. Thereafter, the mixture was cooled in an ice bath and treated successively with 1 ml. of water, 1 ml. of 15 percent aqueous sodium hydroxide solution and 3 ml. of water. The resulting mixture was filtered and the filtrate concentrated in vacuo to give a solid which was recrystallized from ethyl acetate to give 0.773 g. (81 percent) of product which again was recrystallized from ethyl acetate-Skellysolve B hexanes to give pure 3-benzyl-9-methoxy-1,2,3,4,5,6-hexahydroazepino[4,5-b]indole of melting point 127.5°–129.5° C.
Analysis:
Calcd. for $C_{20}H_{22}N_2O$:
C, 78.40; H, 7.24; N, 9.14.
Found:
C, 78,45; H, 7.35; N, 9.42.

Preparation 12 3-Benzyl-8-methoxy-1,2,3,4,5,6-hexahydroazepino[4,5-b]indole

To a stirred, ice cold suspension of 9 g. of lithium aluminum hydride in 900 ml. of tetrahydrofuran was added 8.93 g. (0.0279 mole) of 3-benzoyl-8-methoxy-1,2,3,4,5,6-hexahydroazepino[4,5-b]indole. The mixture was refluxed in a nitrogen atmosphere for a period of 18 hours, cooled in an ice bath and treated successively with 9 ml. of water, 9 ml. of 15 percent aqueous sodium hydroxide and 27 ml. of water. The mixture was then filtered, the filtrate evaporated, the residue crystallized from ethyl acetate to give 6.62 g. (77.4 percent) of product which upon recrystallization from ethyl acetate gave 3-benzyl-8-methoxy-1,2,3,4,5,6-hexahydroazepino[4,5-]indole of melting point 146.5°–147° C.
Analysis:
Calcd. for $C_{20}H_{22}N_2O$:
C, 78.40; H, 7.24; N, 9.14.
Found:
C, 78.25; H, 7.44; N, 9.33.

Preparation 13 3-Benzyl-10-methoxy-1,2,3,4,5,6-hexahydroazepino[4,5-b]indole

To an ice cold, stirred suspension of lithium aluminum hydride (3 g.) in 300 ml. of tetrahydrofuran was added 2.35 g. (7.26 mmoles) of 3-benzoyl-10-methoxy-1,2,3,4,5,6-hexahydroazepino[4,5-b] indole. This mixture was refluxed for 18 hours in a nitrogen atmosphere then cooled in an ice bath and treated successively with 3 ml. of water, 3 ml. of 15 percent aqueous sodium hydroxide and 9 ml. of water. The mixture was thereupon filtered, the collected solids washed with tetrahydrofuran and the washings and filtrate combined and concentrated to give a solid crude product. This product was crystallized from ethyl acetate-Skellysolve B hexanes to give 1.85 g. (83.3 percent) of 3-benzyl-10-methoxy-1,2,3,4,5,6-hexahydroazepino[4,5]-indole, which after recrystallization from the same solvent mixture had a melting point of 163.5°–164.5° C.
Analysis:
Calcd. for $C_{20}H_{22}N_2O$:
C, 78.40; h, 7.24; N, 9.14.
Found:
C, 78.80; H, 7.42; N, 9.03.

Preparation 14 3-Benzyl-7-methoxy-1,2,3,4,5,6-hexahydroazepino[4,5-b]indole hydrochloride To a stirred, ice-cold suspension of 2 g. of lithium aluminum hydride in 200 ml. of tetrahydrofuran was added 1.85 g. (5.77 mmoles) of 3-benzoyl-7-methoxy-1,2,3,4,5,6-hexahydroazepino[4,5-b]indole. The resulting mixture was refluxed for 18 hours in a nitrogen atmosphere and then decomposed by the successive addition of 2 ml. of water, 15 percent aqueous sodium hydroxide (2 ml.) and 6 ml. of water. The resulting mixture was filtered and the filtrate concentrated under reduced pressure to give a residue. A solution of this residue in ethyl acetate was acidified with methanolic hydrogen chloride, and the resulting crystalline hydrochloride was collected by filtration and dried to yield 1.81 g. (91.5 percent) of benzyl-7-methoxy-1,2,3,4,5,6-hexahydroazepino[

4,5-b]indole hydrochloride of melting point 251°–252.5° C. The recrystallized material from methanol-ethyl acetate melted at 247°–248° C. (dec.).

Analysis:

Calcd. for $C_{20}H_{23}ClN_2O$:

C, 70.06; H, 6.76; N, 8.17; Cl, 10.34.

Found:

C, 70.15; H, 6.94; N, 8.12; Cl, 10.32.

Preparation 15 1,2,3,4,5,6-Hexahydroazepino[4,5-b]indole and cyclohexanesulfamate thereof A solution of 3-benzyl-1,2,3,4,5,6-hexahydroazepino-[4,5-b]indole (1 g.; 3.61 mmoles) in 150 ml. of ethanol was treated with 100 mg. of 10 percent palladium-on-carbon catalyst and hydrogenolyzed in a Parr apparatus at an initial pressure of 50 pounds p.s.i. of hydrogen. After 1.5 hours the reaction was completed and the catalyst removed by filtration. The filtrate was concentrated in vacuo to give a residue which was dissolved in 100 ml. of benzene and the solution was concentrated to give solid crude 1,2,3,4,5,6-hexahydroazepino[4,5-b]indole. This material was dissolved in 10 ml. of ethyl acetate and treated with a solution of cyclohexanesulfamic acid (0.5 g.) in 3 ml. of ethanol. The crystalline salt which resulted was recrystallized from isopropyl alcohol-Skellysolve B hexanes to give 0.17 g. (13.2 percent) of 1,2,3,4,5,6-hexahydroazepino[4,5-b]indole cyclohexanesulfamate of melting point 164°–165° C.

Analysis:

Calcd. for $C_{18}H_{27}N_3O_3S$:

C, 59.15; H, 7.45; N, 11,50; S, 8.77.

Found:

C, 59.16; H, 7.47; N, 11.18; S, 8.62.

Preparation 16 1,2,3,4,5,6-Hexahydroazepino[4,5-b]indole hydrochloride

A solution of 7.58 g. (0.0407 mole) of 1,2,3,4,5,6-hexahydroazepino[4,5-b]indole, obtained as in Preparation 15 in methanol-ethyl acetate was acidified with methanolic hydrogen chloride. Crystallization of the resulting hydrochloride gave 6.74 g. (74.4 percent) of 1,2,3,4,5,6-hexahydroazepino[4,5-b]indole hydrochloride of melting point 250.5°–251.5° C. After recrystallization from methanol-ethyl acetate, the material had a melting point of 247.5°–248.5° C.

Analysis:

Calcd. for $C_{12}H_{15}N_2Cl$.

C, 64.71; H, 6.79; N, 12.58; Cl, 15.92.

Found:

C, 64.93; H, 7.08; N, 12.70; Cl, 16.10.

Preparation 17 9-Methoxy-1,2,3,4,5,6-hexahydroazepino-[4,5-b]indole and hydrochloride thereof A solution of 3-benzyl-9-methoxy-1,2,3,4,5,6-hexahydroazepino[4,5-b]indole (5.21 g.; 0.017 mole) in a mixture of 47 ml. of acetic acid and 100 ml. of 95 percent ethanol was treated with 10 percent palladium-on-carbon catalyst (1 g.) and the mixture hydrogenolyzed at an initial pressure of 40 p.s.i. in a Parr apparatus during 2 hours. The reaction mixture was then filtered through Celite (diatomaceous earth) and the filtrate concentrated under reduced pressure to give a residue. The residue was dissolved in water, cooled in an ice bath and made alkaline with sodium hydroxide solution. The crystalline solid which was thus obtained was collected by filtration, washed with water and dried in vacuo to yield 3.53 g. of 9-methoxy-1,2,3,4,5,6-hexahydroazepino-[4,5-b]indole of melting point 174°–176° C.

A solution of this material in methanol was acidified with methanolic hydrogen chloride and the resulting salt was crystallized from methanol to yield 3.96 g. (92.3 percent) of 9-methoxy-1,2,3,4,5,6-hexahydroazepino[4,5-b]indole hydrochloride of melting point 234°–236° C., which after recrystallization from methanol was 235°–235.5° C.

Analysis:

Calcd, for $C_{16}H_{17}ClN_2O$:

C, 61.77; H, 6.78; Cl, 14.03; N, 11.09.

Found:

C, 61.30; H, 6.85; Cl, 14.11; N, 10.99.

Preparation 18 8-Methoxy-1,2,3,4,5,6-hexahydroazepino-[4,5-b]indole and hydrochloride thereof A mixture of 6.34 g. (0.0207 mole) of 3-benzyl-8-methoxy-1,2,3,4,5,6-hexahydroazepino[4,5-b]indole, 95 percent ethanol (200 ml.) and 1 g. of 10 percent palladium-on-carbon catalyst was hydrogenolyzed at an initial pressure of 39.5 p.s.i. for 8 hours. The resulting mixture was filtered was filtered through Celite (diatomaceous earth) and the filtrate was concentrated in vacuo to give a residue. This residue was crystallized from methanol-ethyl acetate to give 3.24 g. (72.4 percent) of 8-methoxy-1,2,3,4,5,6-hexahydroazepino[4,5-b]indole of melting point 158°–160.5° C.

A solution of the base in methanol was acidified with methanolic hydrogen chloride and the salt was recrystallized from water to give 8-methoxy-1,2,3,4,5,6-hexahydroazepino[4,5-b]indole hydrochloride of melting point 276°–276.5° C. (dec.).

Analysis:

Calcd. for $C_{18}H_{17}ClN_2O$:

C, 61.77; H, 6.78; N, 11.09, Cl, 14.03.

Found:

C, 62.03; H, 6.87; N, 11.17; Cl, 14.12.

Preparation 19 10-Methoxy-1,2,3,4,5,6-hexahydroazepino-[4,5-b]indole and hydrochloride thereof A mixture of 3-benzyl-10-methoxy-1,2,3,4,5,6-hexahydroazepino[4,5-b]indole (1.66 g.; 5.42 mmoles), 200 ml. of 95 percent ethanol and 0.5 g. of 10 percent palladium-on-carbon catalyst was hydrogenolyzed at an initial pressure of 41 p.s.i. over a period of 7 hours. The catalyst was removed by filtration through Celite (diatomaceous earth) and the filtrate was concentrated under reduced pressure to give 10-methoxy-1,2,3,4,5,6-hexahydroazepino[4,5-b]indole as an oil.

This oil was dissolved in methanol and acidified with methanolic hydrogen chloride. The resulting salt was crystallized from methanol-ethyl acetate to give 1.04 g. (75.6 percent) of 10-methoxy-1,2,3,4,5,6-hexahydroazepino[4,5-b]-indole hydrochloride which after additional recrystallization from methanol-ethyl acetate had a melting point of 236° C.

Analysis:

Calcd. for $C_{13}H_{17}ClN_2O$:

C, 61.77; H, 6.78; N, 11.09; Cl, 14.03.

Found:

C 61.95; H, 6.49; N, 10.98; Cl, 14.06.

Preparation 20 7-Methoxy-1,2,3,4,5,6-hexahydroazepino-[4,5-b]indole hydrochloride A mixture of 1.61 g. (4.70 mmoles) of 3-benzyl-7-methoxy-1,2,3,4,5,6-hexahydroazepino[4,5-b]indole hydrochloride, 100 ml. of 95 percent ethanol and 200 mg. of 10 percent palladium-on-carbon catalyst was hydrogenolyzed for a period of 2.75 hours at an initial pressure of 38 p.s.i. The resulting mixture was filtered and the filtrate was concentrated under reduced pressure to give a residue which was crystallized from methanol to give 0.782 g. of material of melting point 275°–277° C. and 0.233 g. of material of melting point 278°–279° C. (85.4 percent yield). This material was recrystallized from methanol to give 7-methoxy-1,2,3,4,5,6-hexahydroazepino[4,5-b]indole hydrochloride of melting point 275°–275.5° C.

Analysis:

Calcd. for $C_{13}H_{17}ClN_2O$:

C, 61.77; H, 6.78; N, 11.09; Cl, 14.03.

Found:

C, 61.83; H, 6.71; N, 10.92; Cl, 13.85, 13.77.

Preparation 21 6-Methyl-1,2,3,4,5,6-hexahydroazepino-[4,5-b]indole and hydrochloride thereof To an ice cold, stirred solution of 1,2,3,4,5,6-hexahydroazepino[4,5-b]indole (3.73 g.; 0.02 mole) in 200 ml. of dry dimehtylformamide was added in a nitrogen atmosphere, 0.960 g. of a 55 percent suspension of sodium hydride in mineral oil (0.022 mole of sodium hydride). This mixture was allowed to warm to 25° C. and stand for 2 hours. It was then cooled in an ice bath and treated during 30 minutes with a solution of methyl iodide (1.37 ml.; 0.022 mole) in 25 ml. of ether. The resulting solution was allowed to stand for 18 hours at 25° C. It was then concentrated under reduced pressure to about 50 ml. and poured into water. The mixture was extracted four times with ether, the ether extracts combined, washed with brine, dried over anhydrous potassium carbonate and concentrated under reduced pressure to give 6-methyl-1,2,3,4,5,6-hexahydroazepino[4,5-b]indole as a residue. This residue was redissolved in ethyl acetate and acidified with methanolic hydrogen chloride and the resulting hydroscopic salt was crystallized from methanol-ethyl acetate to give 3,19 g (75.3 percent) of material which was again recrystallized from methanol-ethyl acetate to give 6-methyl-1,2,3,4,5,6-hexahydroazepino[4,5-b]indole hydrochloride of a melting point of 214°–215° C.

Analysis:
Calcd. for $C_{13}H_{17}N_2Cl$:
C, 65.95; H, 7.24; N, 11.84; Cl, 14.98.
Found:
C, 66.35; H, 6.99; N, 11.78; Cl, 14.90.

Preparation 22 6-Ethyl-1,2,3,4,5,6-hexahydroazepino[4,5-b]indole hydrochloride

A cold solution of 7.45 g. of 1,2,3,4,5,6-hexahydroazepino[4,5-b]indole in 400 ml. of dry dimethylformamide in a nitrogen atmosphere was treated with 1.92 g. of a 55 percent suspension of sodium hydride in mineral oil. The mixture was stirred at room temperature for 3 hours, then cooled and treated with a solution of 3.54 ml. of ethyl iodide in 50 ml. of ether. The addition took place over a period of 15 minutes. The mixture was then allowed to stir at room temperature for about 18 hours. The mixture was thereupon concentrated under reduced pressure to give a residue which was dissolved in 250 ml. of water. The aqueous mixture was extracted three times with ether and three times with methylene chloride. The two extracts were worked separately, that is, washed with brine, then water and finally dried over anhydrous potassium carbonate. Thereafter, the two extracts were combined and concentrated to give a residue which was suspended on 30 g. of silica gel and chromatographed over 450 g. of silica gel using 2 percent ethylamine-48 percent methanol-50 percent ethyl acetate for elution. Fractions of about 150 ml. were collected. The first band (A) consisted of fractions 6–9. The product was found in fractions 14–21 (band B). The B fractions were combined and concentrated under reduced pressure to give a residue which was dissolved in ethyl acetate, cooled and acidified with methanolic hydrogen chloride. The precipitate which resulted was collected by filtration, washed with ethyl acetate and dried in vacuo to yield 7.67 g. of material which was recrystallized from methanol and then three times from methanol-ethyl acetate to give 6-ethyl-1,2,3,4,5,6-hexahydroazepino[4,5-b]indole hydrochloride of melting point 253°–254° C. (dec.).

Analysis:
Calcd. for $C_{14}H_{19}N_2Cl$:
C, 67.05; H, 7.64; N, 11,17; Cl, 14.14.
Found:
C, 67.10; H, 7.90; N, 11.47; Cl, 14.38.

Preparation 23 6-Methyl-9-methoxy-1,2,3,4,5,6-hexahydroazepino[4,5-b]indole hydrochloride and 3,6-dimethyl-9-methoxy-1,2,3,4,5,6-hexahydroazepino[4,5-b]indole hydrochloride In the manner shown in Preparation 22, 9-methoxy-1,2,3,4,5,6-hexahydroazepino[4,5-b]indole was treated with sodium hydride and then with methyl iodide to give a mixture of amines. This mixture was separated by chromatography over silica gel using as eluant a mixture of 2 percent diethylamine-15 percent methanol-83 percent ethyl acetate. Fractions 14–24 contained 3,6-dimethyl-9-methoxy-1,2,3,4,5,6-hexahydroazepino[4,5-b]indole which was converted to its hydrochloride with methanolic hydrogen chloride. Crystallization of this salt from methanol gave 3,6-dimethyl-9-methoxy-1,2,3,4,5,6-hexahydroazepino[4,5-b]indole hydrochloride having a melting point of 270° C. (dec.).

Analysis:
Calcd. for $C_{15}H_{21}ClN_2O$:
C, 64.16; H, 7.54; N, 9.98; Cl, 12.63.

Found:
C, 64.20; H, 7.73; N, 9.82; Cl, 12.78.

Fractions 28–49 from the chromatographic column contained 6-methyl-9-methoxy-1,2,3,4,5,6-hexahydroazepino-[4,5-b]indole which was converted to its hydrochloride with methanolic hydrogen chloride. Crystallization of this salt from methanol gave 6-methyl-9-methoxy-1,2,3,4,5,6-hexahydroazepino[4,5-b]indole hydrochloride having a melting point of 272° C. (dec.).

Analysis:
Calcd. for $C_{14}H_{19}ClN_2O$:
C, 63.03; H, 7.18; N, 10.50; Cl, 13.29.
Found:
C, 62.89; H, 7.25; N, 10.36; Cl, 13.25.

Preparation 24 6-Methyl-10-methoxy-1,2,3,4,5,6-hexahydroazepino[4,5-b]indole hydrochloride In the manner given in Preparation 23, 10-methoxy-1,2,3,4,5,6-hexahydroazepino[4,5-b]indole was treated with sodium hydride and then with methyl iodide to give 6-methyl-10-methoxy-1,2,3,4,5,6-hexahydroazepino[4,5-b]indole hydrochloride of melting point 276.5°–278° C.

In the manner given in the above preparation other 6-alkyl-1,2,3,4,5,6-hexahydroazepino[4,5-b]indole hydrochlorides are prepared such as:

6-methyl-7-methoxy-1,2,3,4,5,6-hexahydroazepino[4,5,-b]indole hydrochloride 6-methyl-8-methoxy-1,2,3,4,5,6-hexahydroazepino[4,5-b]indole hydrochloride 6-ethyl-10-methoxy-1,2,3,4,5,6-hexahydroazepino[4,5-b]indole hydrochloride 6-propyl-8-methoxy-1,2,3,4,5,6-hexahydroazepino[4,5-b]indole hydrochloride 6-isopropyl-7-methoxy-1,2,3,4,5,6-hexahydraozepino-[4,5-b]indole hydrochloride 6-methyl-9-fluoro-1,2,3,4,5,6-hexahydroazepino[4,5-b]-indole hydrochloride 6-propyl-7-fluoro-1,2,3,4,5,6-hexahydroazepino[4,5-b]-indole hydrochloride and the like.

The following examples illustrate the best mode contemplated by the inventor for carrying out the invention but are not to be construed as limiting the scope thereof.

EXAMPLE 1

One thousand tablets for oral use, each containing 100 mg. of 6-methyl-1,2,3,4,5,6-hexahydroazepino[4,5-b]indole hydrochloride are prepared from the following ingredients:

| | |
|---|---|
| 6-methyl-1,2,3,4,5,6-hexahydroazepino-[4,5-b]indole hydrochloride, hydrate | 100 Gm. |
| Dicalcium phosphate | 200 Gm. |
| Methylcellulose, U.S.P. (15 cps.) | 6.5 Gm. |
| Talc | 30 Gm. |
| Calcium stearate | 3.5 Gm. |

The 6-methyl-1,2,3,4,5,6-hexahydroazepino[4,5-b]indole hydrochloride hydrate and dicalcium phosphate are mixed well, granulated with 7.5 percent w/v aqueous solution of methyl cellulose, passed through No. 8 screen and dried carefully. The dried granules are passed through a No. 12 screen, mixed with the talc and stearate and compressed into tablets.

The foregoing tablets are useful in the treatment of obesity in adult humans at a dosage of 1 tablet per day.

EXAMPLE 2

One thousand two-piece hard gelatin capsules for oral use, each capsule containing 10 mg. of 6-methyl-1,2,3,4,5,6-hexahydroazepino[4,5-b]indole hydrochloride hydrate and 15 mg. of phenobarbital are prepared from the following ingredients:

| | |
|---|---|
| 6-methyl-1,2,3,4,5,6-hexahydroazepino [4,5-b]indole hydrochloride, hydrate | 10 Gm. |
| Phenobarbital | 15 Gm. |
| Corn starch | 120 Gm. |
| Talc | 60 Gm. |
| Magnesium stearate | 25 Gm. |

The finely powdered materials are mixed thoroughly, then filled into hard gelatin capsules of appropriate size.

The foregoing capsules are useful in treatment of obesity at a dosage of 1 capsule twice a day.

EXAMPLE 3

An aqueous oral preparation containing in each 5 ml., 50 mg. of 6-methyl-1,2,3,4,5,6-hexahydroazepino[4,5-b]-indole hydrochloride, hydrate is prepared from the following ingredients:

| | | |
|---|---|---|
| 6-methyl-1,2,3,4,5,6,-hexahydroazepino-[4,5-b]indole hydrochloride, hydrate | 100 | Gm. |
| Methylparaben | 7.5 | Gm. |
| Propylparaben | 2.5 | Gm. |
| Saccharin sodium | 12.5 | Gm. |
| Glycerin | 3000 | ml. |
| Tragacanth powder | 100 | Gm. |
| Orange oil flavor | 10 | Gm. |
| F. D. and C. Orange dye | 7.5 | Gm. |
| Deionized water q.s. | 10,000 | ml. |

The foregoing composition is useful in the control of obesity in children at a dosage of 1 teaspoonful every 6 hours.

EXAMPLE 4

A sterile aqueous suspension for intramuscular injection, containing in each ml. 100 mg. of 6-methyl-1,2,3,4,5,6-hexahydroazepino[4,5-b]indole hydrochloride, hydrate, is prepared from the following ingredients:

| | | |
|---|---|---|
| 6-methyl-1,2,3,4,5,6-hexahydroazepino-[4,5-b]hydrochloride, hydrate | 100 | Gm. |
| Sodium carboxymethylcellulose, low viscosity | 10 | Gm. |
| Polysorbate 80, U.S.P. | 4 | Gm. |
| Propylparaben, U.S.P. | 0.4 | Gm. |
| Water for injection q.s. | 1,000 | ml. |

The foregoing parenteral suspension is useful in the treatment of an obese adult at a dosage of 1 ml. twice a day.

EXAMPLE 5

One thousand tablets are prepared from the following types and amounts of ingredient:

| | | |
|---|---|---|
| 6-methyl-1,2,3,4,5,6-hexahydroazepino-[4,5-b]indole hydrochloride, hydrate | 500 | Gm. |
| Citric acid, powder | 50 | Gm. |
| Talc | 50 | Gm. |
| Magnesium stearate | 2.5 | Gm. |

The ingredients are mixed together and slugged. The slugs are screened and pressed into tablets. The foregoing tablets are useful in the treatment of obesity at a dose of 1 every 6 hours.

EXAMPLE 6

One thousand hard gelatin capsules are prepared from the following types and amounts of ingredients:

| | | |
|---|---|---|
| 6-methyl-1,2,3,4,5,6-hexahydroazepino-[4,5-b]indole hydrochloride, hydrate | 25 | Gm. |
| Diethylpropion hydrochloride | 15 | Gm. |
| Starch | 25 | Gm. |
| Terra alba | 75 | Gm. |
| Magnesium stearate | 3.5 | Gm. |

The ingredients are powdered and mixed together until uniformly dispersed and filled into hard gelatin capsules.

The capsules are useful in the treatment of obesity at a dose of 1 capsule every 6 hours.

EXAMPLE 7

One thousand tablets for oral administration, each containing 25 mg. of 6-methyl-1,2,3,4,5,6-hexahydroazepino-[4,5-b]indole hydrochloride, hydrate and 16.2 mg. of chlorpromazine are prepared from the following types and amounts of ingredients:

| | | |
|---|---|---|
| 6-methyl-1,2,3,4,5,6-hexahydroazepino-[4,5-b]indole hydrochloride, hydrate | 25 | Gm. |
| Chlorpromazine | 16.2 | Gm. |
| Lactose | 175 | Gm. |
| Starch | 15 | Gm. |
| Magnesium stearate | 1.5 | Gm. |

The ingredients are thoroughly mixed and slugged. The slugs are broken down by forcing through a screen and the resulting granules are then compressed into tablets.

The preceding tablets are useful for the treatment of obesity in adults at a dose of 1 tablet twice a day.

EXAMPLE 8

One thousand ml. of a syrup is prepared from the following types and amounts of ingredients:

| | | |
|---|---|---|
| 6-methyl-1,2,3,4,5,6-hexahydroazepino-[4,5-b]indole hydrochloride, hydrate | 50 | Gm. |
| Cocoa syrup U.S.P., q.s. | 1000 | ml. |

The 6-methyl-1,2,3,4,5,6-hexahydroazepino[4,5-b]-indole hydrochloride hydrate is stirred with cocoa syrup until dissolved.

The syrup is useful in the treatment of adult obesity at a dose of 1 teaspoonful four times a day.

EXAMPLE 9

One thousand ml. of an elixir, containing 100 mg. of 6-methyl-1,2,3,4,5,6-hexahydroazepino[4,5-b]indole hydrachloride hydrate and 8.1 mg. of phenobarbital in each 5 ml., is prepared from the following types and amounts of ingredients:

| | | |
|---|---|---|
| 6-methyl-1,2,3,4,5,6-tetrahydroazepino-[4,5-b]indole hydrochloride, hydrate | 20 | Gm. |
| Phenobarbital | 1.62 | Gm. |
| Citric acid | 0.1 | Gm. |
| F.D.C. Red No. 1 | 0.04 | Gm. |
| Saccharin | 0.1 | Gm. |
| Sucrose | 200 | Gm. |
| Oil of spearmint | 0.1 | Gm. |
| Oil of wintergreen | 0.1 | Gm. |
| Polysorbate 80 U.S.P. | 1 | Gm. |
| Ethanol 95% | 200 | ml. |
| Glycerin | 150 | ml. |
| Water q.s. | 1000 | ml. |

The sugar is dissolved in 450 ml. of water and the citric acid, color and the 6-methyl-1,2,3,4,5,6-hexahydroazepino[4,5-b]indole hydrochloride, hydrate added thereto. The phenobarbital and saccharin are added to the mixture of alcohol and glycerin and stirred until dissolved. The flavor are mixed with the polysorbate 80 and added to the alcohol-glycerin solution followed by the addition of the sugar solution and sufficient water to make 1,000 ml.

The syrup is useful in the treatment of obese children at a dose of 1 teaspoonful three times a day.

EXAMPLE 10

A sterile aqueous solution for parenteral administration, containing 50 mg. of 6-methyl-1,2,3,4,5,6-hexahydroazepino[4,5-b]indole hydrochloride hydrate in each ml., is prepared from the following types and amounts of ingredients:

| | | |
|---|---|---|
| 6-methyl-1,2,3,4,5,6-tetrahydroazepino-[4,5-b]indole hydrochloride hydrate | 50 | Gm. |
| Chlorpromazine hydrochloride | 5 | Gm. |
| Water for injection q.s. | 1,000 | ml. |

The 6-methyl-1,2,3,4,5,6-hexahydroazepino[4,5-b]indole hydrochloride hydrate and chloropromazine hydrochloride are dissolved in the water for injection and the solution sterilized by filtration. The sterile solution is filled into 2 ml. sterile vials and sealed.

The composition is useful in the treatment of anxiety and obesity at a dose of 1 ml.

EXAMPLE 11

One thousand capsules for oral administration are prepared from the following ingredients:

| | |
|---|---|
| 6-methyl-1,2,3,4,5,6-hexahydroazepino-[4,5-b]indole hydrochloride, hydrate micropulverized | 100 Gm. |
| Lactose, hydrous | 132.5 Gm. |
| Magnesium stearate powder | 2.5 Gm. |

The powders are mixed thoroughly and filled into No. 3 hard gelatin capsules.

The capsules are useful in the treatment of obesity in adults at a dose of one capsule four times a day.

EXAMPLE 12

One thousand capsules for oral administration are prepared from the following ingredients:

| | |
|---|---|
| 6-methyl-1,2,3,4,5,6-hexahydroazepino-[4,5-b]indole hydrochloride hydrate micropulverized | 50 Gm. |
| Lactose, hydrous | 207.5 Gm. |
| Magnesium stearate powder | 2.5 Gm. |

The powders are mixed thoroughly and filled into No. 3 hard gelatin capsules.

The capsules are useful in the treatment of obese children at a dose of one capsule three times a day.

EXAMPLE 13

One thousand suppositories, each weighing 2.5 Gm. and containing 250 mg. of 6-methyl-1,2,3,4,5,6-hexahydroazepino-[4,5-b]indole hydrochloride, hydrate are prepared from the following types and amounts of ingredients:

| | |
|---|---|
| 6-methyl-1,2,3,4,5,6-hexahydroazepino-[4,5-b]indole hydrochloride, hydrate | 250 Gm. |
| Propylene glycol | 165 Gm. |
| Polyethylene glycol 4,000 q.s. | 2,500 Gm. |

The 6-methyl-1,2,3,4,5,6-hexahydroazepino[4,5-b]indole hydrochloride hydrate is added to the propylene glycol and the mixture milled until uniformly dispersed. The PEG 4,000 is melted and the propylene glycol dispersion added. The suspension is poured into molds and allowed to cool and solidify.

The foregoing suppositories are useful in the treatment of obesity at a dose of 1 suppository rectally twice a day.

EXAMPLE 14

Following the procedure of the preceding Examples 1 to 13, inclusive, dosage forms are similarly prepared by substituting an equivalent amount of 6-ethyl-1,2,3,4,5,6-hexahydroazepino[4,5-b]indole hydrochloride 6-methyl-10-methoxy-1,2,3,4,5,6-hexahydroazepino[4,5-b]indole hydrochloride 6-methyl-9-methoxy-1,2,3,4,5,6-hexahydroazepino-[4,5-b]indole hydrochloride, for the 6-methyl-1,2,3,4,5,6-hexahydroazepino[4,5-b]indole hydrochloride of the Examples.

I claim:

1. A therapeutic composition for inducing anorexia comprising, in unit dosage form, from about 5.0 mg. to about 500 mg. of a member selected from the group consisting of compounds of the formula:

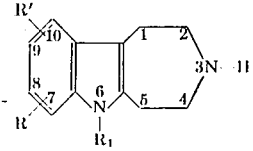

wherein R and R' are selected from the group consisting of hydrogen, alkoxy and alkyl containing from one to three carbon atoms, inclusive, and halogen; and $R_1$ is alkyl containing from one to three carbon atoms and the pharmacologically acceptable acid addition salts thereof in association with a pharmaceutical carrier.

2. The composition of claim 1 wherein the compound selected is 6-methyl-1,2,3,4,5,6-hexahydroazepino[4,5-b]indole hydrochloride.

3. A process for inducing anorexia comprising the administration of an appetite suppressing amount of a member selected from the group consisting of compounds of the formula

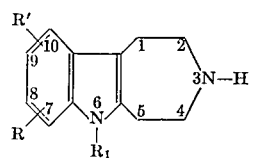

wherein R and R' are selected from the group consisting of hydrogen, alkoxy and alkyl containing from one to three carbon atoms, inclusive, and halogen; and $R_1$ is alkyl containing from one to three carbon atoms and the pharmacologically acceptable acid addition salts thereof to an obese human subject.

4. The process of claim 3 wherein from about 20 mg. to about 1,000 mg. of said member is administered per kilogram body weight of said subject.

5. The process of claim 3 wherein from about 5 mg. to about 500 mg. of said member is administered.

6. The process of claim 3 wherein the compound selected is 6-methyl-1,2,3,4,5,6-hexahydroazepino[4,5-b]indole hydrochloride.

7. The process of claim 4 wherein the compound selected is 6-methyl-1,2,3,4,5,6-hexahydroazepino[4,5-b]indole hydrochloride.

8. The process of claim 5 wherein the compound selected is 6-methyl-1,2,3,4,5,6-hexahydroazepino[4,5-b]indole hydrochloride.

* * * * *